(No Model.)

A. SEARLS.
TOP PROP NUT.

No. 407,904. Patented July 30, 1889.

Witnesses
Frederick Woodruff
P. D. Randall

Inventor
Anson Searls

UNITED STATES PATENT OFFICE.

UNITED STATES PATENT OFFICE.

ANSON SEARLS, OF NEWARK, NEW JERSEY, ASSIGNOR TO THE SEARLS-RANDALL COMPANY, OF SAME PLACE.

TOP-PROP NUT.

SPECIFICATION forming part of Letters Patent No. 407,904, dated July 30, 1889.

Application filed April 9, 1889. Serial No. 306,630. (No model.)

*To all whom it may concern:*

Be it known that I, ANSON SEARLS, a citizen of the United States, residing at Newark, in the county of Essex, State of New Jersey, have invented certain new and useful Improvements in Top-Prop Nuts for Carriages; and I do hereby declare that the following is a full, clear, and exact description of the invention, which will enable others skilled in the art to which it appertains to make and use the same.

My invention relates to top-prop nuts for carriages; and it consists in a nut provided with a cap and a top finishing plate or covering attached to the edge of the cap by a molding, also to a bottom finishing-covering, all as hereinafter more fully described.

Figure 1:
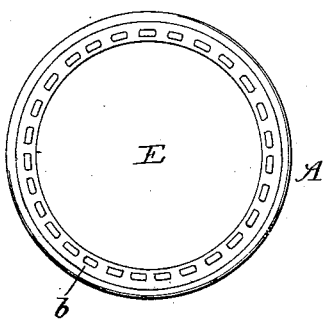
Figure 2:
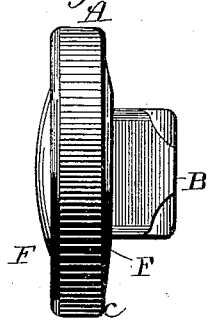
Figure 3:
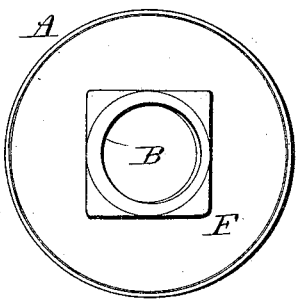
Figure 4:
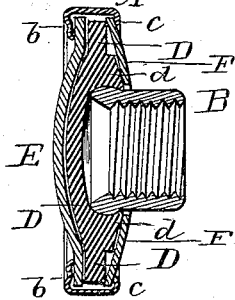
Figure 5:
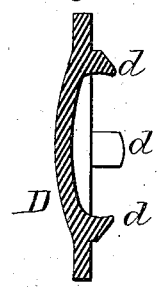
Figure 6:
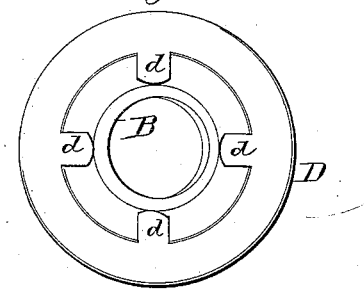
Figure 7:
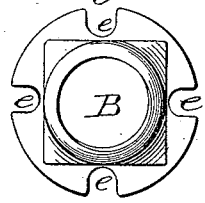
Figure 8:
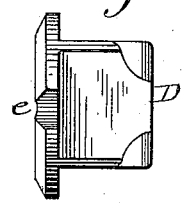

The drawings herewith show: Figure 1 a view of the top, Fig. 2 of the side in perspective, and Fig. 3 of the bottom. Fig. 4 is a sectional view of all the parts, and Fig. 5 of the cap D. Fig. 6 is a plan view of the nut B and cap D, showing the spurs $d$. Fig. 7 is a bottom view of the nut B, and Fig. 8 is a side view.

The threaded nut B, made in the usual form, is provided with a flange, in which are slots or holes $e$, corresponding to spurs $d$ on the cap D. This cap is firmly attached to the nut by the spurs $d$, riveted or clinched, as shown at $d$, Fig. 4. The nut B and cap D may be cast in one piece; but for convenience in threading the nut I prefer to unite them by spurs firmly as one piece. These parts are usually made of malleable iron with rough exterior, which I finish by covering E on the top side. This covering may be made of leather or any fibrous material that will admit of a high and durable finish, or it may be made of metal and plated, silver, gold, or nickel, or ornamented in any desirable way. The cap D is made convex, as shown, or any desirable form, and the covering E drawn over it or stamped to fit the same. This covering E is attached to the cap D at the rim by a molding A, made in U form, that rests on the covering E at $b$ and turns under the rim of the cap at $c$. This molding A is first made in cup form drawn or pressed and the center is cut out, leaving the rim $b$ any desired width, as shown in Figs. 1 and 4, and is completed by turning the edge $c$ under.

The under side of the cap D may be finished and the rivets $d$, Fig. 4, covered by a leather covering F, perforated to receive the nut B and held in place by the molding A at $c$. By this means I am enabled to make a nut having a bottom and top leather covering with a stiff metal rim or edge, and the cap D, cast in metal, forms a solid backing for the covering E, that cannot be accidentally mashed or displaced.

Having described my invention, I desire to secure by Letters Patent—

1. The combination of a nut B and a cap D, a covering E, and molding A, as and for the purpose set forth.

2. The nut B and cap D, in combination with coverings E and F and molding A, as and for the purpose set forth.

ANSON SEARLS.

Witnesses:
FREDERICK WOODRUFF,
SAML. J. SMITH.